Patented Feb. 12, 1935

1,991,314

UNITED STATES PATENT OFFICE 1,991,314

STORAGE BATTERY PLATE MATERIAL

Rufus N. Chamberlain, Chicago, Ill., assignor, by mesne assignments, to Gould Storage Battery Corporation, Depew, N. Y., a corporation of Delaware No Drawing. Application March 7, 1930, Serial No. 434,172

3 Claims. (Cl. 136—26)

The invention relates to the manufacture of plates for storage batteries and has for its general object the provision or production of an active material which will effect a substantial saving in the cost of manufacture.

Heretofore it has been a common practice to make a paste for storage battery plates by mixing litharge PbO or red lead $Pb_3O_4$, or a combination of both, into a paste with sulphuric acid.

An important object of the invention is to provide storage battery plate material consisting principally of finely divided or pulverulent metallic lead together with an additional ingredient which will act to unite the mass into a self-sustaining whole of homogeneous character throughout.

A more specific object of my invention is to reduce the cost of production of storage battery plates by utilizing a preponderating amount of finely divided metallic lead with some low oxide thereof, the sub-oxide $Pb_2O$, together with a suitable proportion of highly oxidized lead, such as litharge PbO, and adding to this mixture a sulphuric acid solution or soluble sulphate solution to form a paste material.

I am aware that attempts have been made to produce a paste for storage battery plates by utilizing lead in a pulverulent form with an addition thereto of lead sulphate and sulphuric acid solution but such attempts have uniformly failed by reason of the fact that the lead sulphate does not combine with the pulverulent lead and no substantial interlocking crystalline cementation is produced. Metallic or non-reactive lead is so chemically inert to sulphuric acid solution that without the addition of a suitable ingredient, insufficient amounts of lead sulphate solution are formed to permeate the entire mass and while there may be a certain crystallization it is merely sporadic and the result is that the mass does not become a coherent unit.

I have discovered that by adding to the finely divided lead, which may have with it a certain amount of low oxide such as the sub-oxide $Pb_2O$, a comparatively small amount of high oxide such as litharge PbO that the defects which have heretofore prevented the use of such material, that is the lack of proper cementation, are corrected and that upon the formation of a paste by the addition of a sulphuric acid solution the highly oxidized lead or litharge is converted, at least largely, by chemical action, into lead sulphate and the sulphate crystals so formed act as a cement or binder to unite the whole firmly into a coherent mass.

In the actual carrying out of the invention I utilize inert pulverulent material consisting principally of metallic lead and a small proportion of a low oxide of lead such as $Pb_2O$. This lead dust or powder may have a metallic lead content of approximately 65% or more, and is non-reactive. This powdered material may be obtained by placing pieces or balls of lead in a perforated cylinder and rotating it so that particles of lead will be ground off by attrition. Heat may or may not be applied and, if desired, cooling may be resorted to to partly counteract the heat generated by friction. Furthermore the oxygen content of the atmosphere within the cylinder may be regulated to increase or decrease the inevitable oxidation of the lead particles. An apparatus and the method for producing this lead dust with more or less of a low oxide coating is disclosed in my co-pending application for patent for Method of making lead powder, filed April 26, 1930, Serial No. 447,572 (now Patent No. 1,910,280, granted May 23, 1933). The present invention is not concerned specifically with the actual making of the inert or non-reactive lead dust or powder but the method is referred to simply for the sake of clearness and by way of pointing out what the material is. To this material I add a high oxide of lead, preferably litharge, the proportion of which may vary between 5 and 40% though more can be utilized if desired, the general rule being that the greater the proportion of litharge the greater will be the hardness of the subsequently formed plates. To this mixture I add sufficient sulphuric acid solution, preferably of about 1.10 specific gravity to convert the mass into a paste which is kneaded and mixed until it is of uniform character and consistency. The paste is then applied to storage battery grids by either manual or mechanical means as may be desired. It is advisable that the material be used within a few hours after mixing as I have discovered that the sooner it is applied to the grids the better the resulting plates will be. The sulphuric acid in the mix converts a substantial portion of the highly oxidized lead or litharge into lead sulphate and there is probably also a slight conversion of the metallic lead and low oxide into a lead sulphate. The sulphate so formed is in a rather fluid solution which permeates the entire mass so that when crystallization occurs the crystals will interlock with one another and with the particles of the mass in a manner analogous to the setting of hydraulic cement.

After the plates have been pasted as above described and permitted to harden they may be air or oven dried and/or may be given a suitable acid pickle, the treatment to which they are subjected depending upon the character of the service for which the plates are required and also as to whether they are to be used as positives or negatives. The subsequent treatment is not an essential of this invention and the question is one that may well be left to the judgment of the manufacturer.

The paste forming compound above described readily admits of the addition thereto of special ingredients such as are now employed by storage battery manufacturers to obtain the porosity and other desirable characteristics. Such added constituents in no way affect the essential feature of my invention which resides in the addition of highly oxidized lead such as litharge to a mass of pulverulent material comprising principally inert metallic lead with a relatively small proportion of low oxide therewith and the mixing of these ingredients so that the highly oxidized lead will permeate the mass and effect cementation thereof in the manner set forth. As the inert powder can be produced at low cost, in fact a mere fraction of the cost of production of either litharge or red lead, it is manifest that by the use of my invention there will be a material saving in the cost of manufacture of storage battery plates.

While I have described certain detailed steps, ingredients and proportions thereof it should be distinctly understood that I reserve the right to make all such changes, variations or modifications as will not depart from the spirit of the invention or the scope of the claims hereunto appended.

Having thus described the invention, I claim:

1. A composition for use in the manufacture of storage battery plates of the pasted lead-acid type, comprising between 77 and 92% of inert or non-reactive lead powder containing approximately 65% of powdered metallic lead and the remainder of lead sub-oxide, between 8 and 23% of litharge, and sufficient sulphuric acid to form a paste capable of being kneaded, said proportions being by weight.

2. A composite material for making storage battery plates of the lead-acid type, comprising the combination of between 77 and 92% by weight of chemically inert or non-reactive lead powder containing approximately 65% by weight of metallic lead in powdered form and the remainder of a mixture of lead sub-oxide and lead monoxide, between 8 and 23% by weight of litharge, and sulphuric acid in a quantity sufficient to form a mixable and kneadable paste.

3. A composition for making storage battery plates of the lead-acid type, consisting of approximately 85% of chemically inert or non-reactive lead powder containing approximately 65% of metallic lead in powdered form and the remainder of a mixture of lead sub-oxide, $Pb_2O$, and lead monoxide, $PbO$, and approximately 15% of litharge, and dilute sulphuric acid sufficient to form a mixable and kneadable paste.

RUFUS N. CHAMBERLAIN.